Patented Aug. 10, 1943

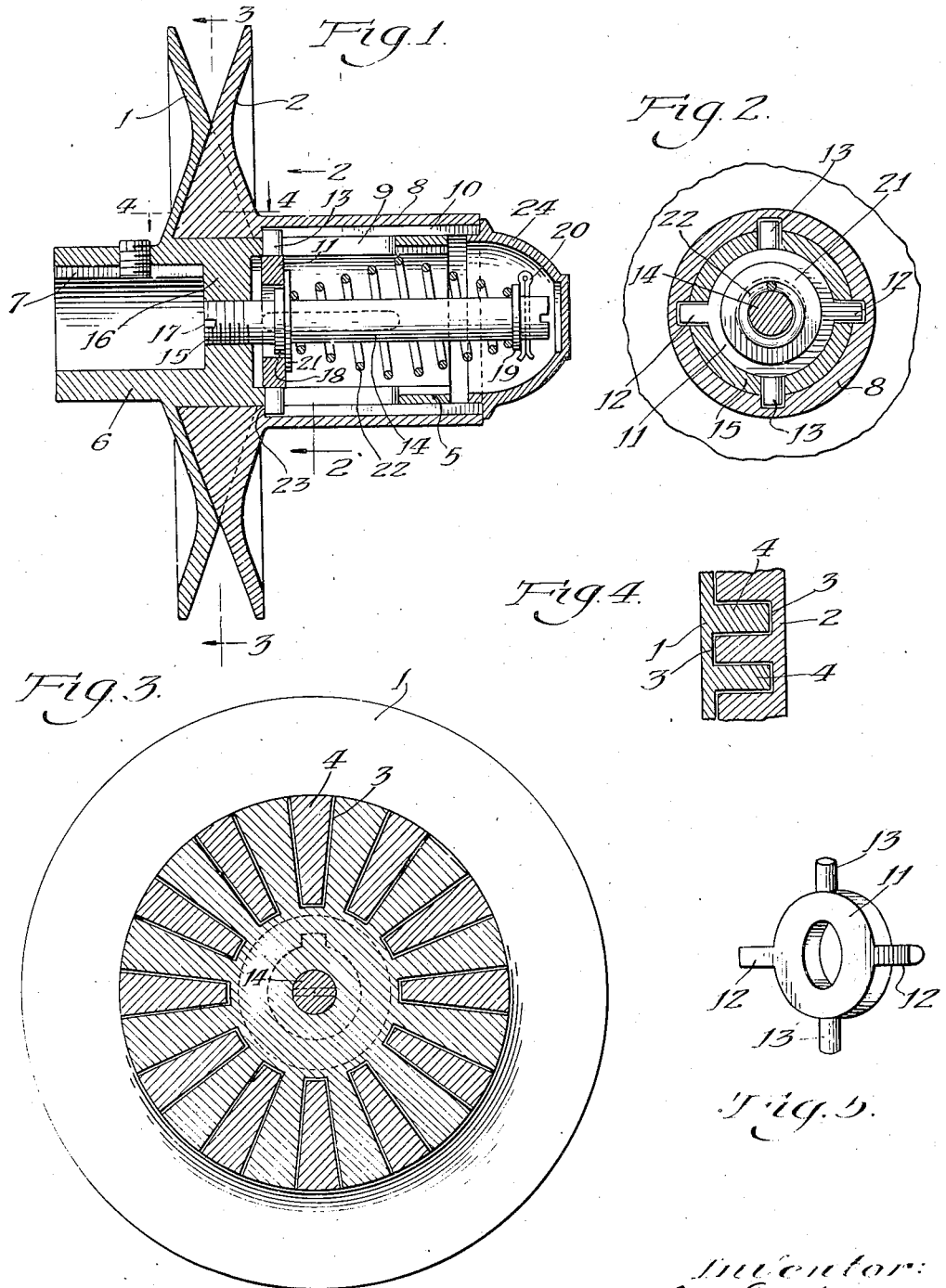

2,326,468

UNITED STATES PATENT OFFICE 2,326,468

VARIABLE PITCH PULLEY

Paul F. Koch, Oak Park, Ill., assignor to Chicago Die Casting Manufacturing Company, a corporation of Illinois Application March 5, 1943, Serial No. 478,055

7 Claims. (Cl. 74—230.17)

The present invention relates to pulleys in which the pitch may be automatically varied upon changing the tension of the belt. It has for its object to produce a simple and novel construction which shall consist of a few sturdy parts, be effective and reliable in operation and have an indefinite life.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a central longitudinal section of a pulley constructed in accordance with a preferred form of my invention; Fig. 2 is a section on line 2—2 of Fig. 1; Fig. 3 is a section on line 3—3 of Fig. 1; Fig. 4 is a section on line 4—4 of Fig. 1, showing only what appears in the plane on which the section is taken; and Fig. 5 is a perspective view of the spider which serves as a spring follower and to lock the two pulley sections against relative rotary movements while permitting relative axial movements.

Referring to the drawing, 1 and 2 represent complementary frustoconical pulley sections so placed as to provide between them a groove or valley V-shaped in cross section. The faces of these sections or pulley flanges, at the smaller ends of the cones, are slotted radially to provide valleys 3 separated by ribs or webs 4. The ribs or webs on one flange are adapted to enter the valleys in the other. Thus, when the two sections or flanges are interengaged, as in Fig. 1, the belt-receiving valley is narrow and extends only a short distance inwardly from the periphery of the pulley. As the flanges are spread apart, the valley widens and deepens.

The member 1 has on the inner or frustoconical side a long, hollow, sleeve-like hub 5; whereas on the other side is a short hub 6, into which a shaft to support the pulley may extend. The hub 6 is also in the form of a sleeve and may be provided with an internal longitudinal keyway 7. These two hubs are, of course, coaxial relatively to each other and to the pulley flange. The member 2 is provided with a long hub in the form of a sleeve 8 which surrounds and is a slidable fit on the hub 5. The hub 8 preferably extends somewhat beyond the free end of the hub 5. The hubs 5 and 6 are provided with registering longitudinal slots at least as long as the distance through which it is desired that the pulley shall be capable of expanding. In the arrangement shown, the slots 9 in the inner hub extend entirely through the wall of the latter and terminate short of the outer end of the hub, whereas the slots 10 in the outer hub are in the form of grooves which leave the cylindrical exterior surface of the hub unbroken.

Loosely arranged within the hub 5 is a spider comprising a thick washer 11 provided at its periphery with radial arms or projections corresponding in number and in disposition to the slots or grooves in one of the hubs. In the arrangement shown, there are four of such arms, placed ninety degrees apart from each other. Two of the arms 12, disposed on the same diameter, are flat on one side and rounded on the other side, whereas the other two arms, 13, are rounded on both sides to form journals, as it were, about which the spider can be swung when placing it in position or removing it. The parts are so proportioned that the spider may be inserted edgewise into the hub assembly, be shifted to enter the arms 13 in an opposite pair of registering slots, and the spider be then swung about the axis of these arms until the arms 12 enter the two remaining pairs of slots.

Arranged axially of the hub 5 is a sturdy post 14 having a screw-threaded inner end as indicated at 15, which is screwed into and through the wall or web 16 that separates the bores of the hubs 5 and 6 from each other. This end of the post is shown as having therein a kerf 17, so that the post may be unscrewed by inserting a screw driver through the hub 6. The post is provided with an external shoulder in the form of a collar 18 near the screw-threaded portion; the collar being small enough in diameter to be able to pass freely through the central hole in the spider. A second shoulder 19 is arranged on the post near the free end of the latter. In the arrangement shown, this shoulder is a washer held in place by a cotter pin 20. There is also on the post a washer 21 larger than the opening in the spider so that it engages with the face of the spider surrounding the opening. Surrounding the post between the washer 19 and the washer 21, is a compression spring, the coils of which increase in diameter from both ends toward the middle. This type of spring provides a more uniform pressure throughout the range of closing movements than does an ordinary coil spring. It will be seen that the post, with its spring, forms a unit complete in itself, the parts of which may be assembled in a factory, so that the post need only be screwed into the pulley wall in making the final pulley assembly.

It will be seen that the spring, through the washer 21, constantly tends to force the spider toward the left as viewed in Fig. 1. The arms 12 and 13 engage with the shoulders 23 at the inner ends of the slots or grooves 10 in the outer hub so that, when free to do so, this hub and the flange 2 are yieldingly held at the left hand end of their range of movement. However, when the sides of the valley in the periphery of the pulley are subjected to forces tending to spread them apart, the flange member 2 is driven toward the right and, carrying the spider with it, compresses the spring. On account of the shape of the spring, its resistance to compression, throughout the range through which it need be compressed in service, does not vary enough to subject the belt to an objectionable sidewise pressure, regardless of the radial distance of the belt from the axis of the pulley.

The outer end of the hub 8 may be closed by means of a dome-like cap 24, frictionally held in place. This permits the use of a long post and spring, without making the hub unduly long.

It will further be seen that, aside from the spring, the two washers and the cotter pin, there are only four parts to my improved pulley. All of these parts are simple and sturdy and will last indefinitely. Also, because the spring is assembled on the post to form a self-contained unit that need only be screwed into the pulley in assembling the latter at the place of manufacture, this unit can be taken out and replaced when necessary, without danger of losing any of its parts or disturbing their relation to each other. The cop over the open end of the composite hub may be such a tight fit that no user is likely to try and take it off unnecessarily. However, should occasion arise to take the pulley apart, the user need only detach it from its supporting shaft and, by unscrewing the post, push the cap off the end of the hub.

Also, because the spring need not at any time be stronger than necessary to keep the pulley from expanding under the pull of a belt, while in use, the belt need only be lengthened or shortened without material increase in the tension thereof or in the gripping pressure thereon, when the pitch diameter is to be changed.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A pulley comprising two complementary flange sections, the first section having a long hollow hub on one side, the second section surrounding the inner end of the hub and having a sleeve fitting slidably over that part of the hub projecting beyond said second section, a post arranged axially of the hub and fixed at its inner end to the first flange section, the post having thereon an external shoulder at its outer end, the hub and the sleeve having long registering longitudinal slots therein, a loose spider surrounding said post and having arms projecting through said slots and into said grooves, and a spring device surrounding said post and engaged at its ends with said shoulder and said spider respectively.

2. A pulley comprising two complementary flange sections, the first section having a long hollow hub on one side, the second section surrounding the inner end of the hub and having a sleeve fitting slidably over that part of the hub projecting beyond said second section, a post arranged axially of the hub and fixed at its inner end to the first flange section, the post having thereon an external shoulder at its outer end, the hub having longitudinal slots through the wall thereof, said sleeve having internal grooves registering with said slots, a loose spider surrounding said post and having arms projecting through said slots and into said grooves, and a spring device surrounding said post and engaged at its ends with said shoulder and said spider, respectively.

3. A pulley comprising two complementary flange sections, the first section having a long hollow hub on one side, the second section surrounding the inner end of the hub and having a sleeve fitting slidably over that part of the hub projecting beyond said second section, a post arranged axially of the hub and fixed at its inner end to the first flange section, the post having thereon an external shoulder at its outer end, the hub having longitudinal slots through the wall thereof, said sleeve having internal grooves registering with said slots, a loose spider surrounding said post and having arms projecting through said slots and into said grooves, a spring device surrounding said post and engaged at its ends with said shoulder and said spider, respectively, and a cap closing the outer end of said sleeve.

4. A pulley comprising two complementary flange sections, the first section having a long hollow hub on the inner side, the second section surrounding the inner end of the hub and having a sleeve fitting slidably over that part of the hub projecting beyond said second section, a post arranged axially of the hub and screwed at its inner end into and through the first flange section, the post having an external shoulder at its outer end, the hub having longitudinal slots through the wall thereof, said sleeve having internal grooves registering with said slots, a loose spider surrounding said post and having arms projecting through said slots and into said grooves, and a spring device surrounding said post and engaged at its ends with said shoulder and said spider respectively; and a second, sleeve-like hub on the outer side of the first flange section coaxial with the first hub and adapted to be fitted upon the end of a shaft.

5. A pulley comprising two complementary flange sections, the first section having a long hollow hub on the inner side, the second section surrounding the inner end of the hub and having a sleeve fitting slidably over that part of the hub projecting beyond said second section, a post arranged axially of the hub and screwed at its inner end into and through the first flange section, the post having an external shoulder at its outer end and a kerf in the end face at the opposite end, the hub having longitudinal slots through the wall thereof, said sleeve having internal grooves registering with said slots, a loose spider surrounding said post and having arms projecting through said slots and into said grooves, and a spring device surrounding said post and engaged at its ends with said shoulder and said spider, respectively; and a second, sleeve-like hub on the outer side of the first flange section coaxial with the first hub and adapted to be fitted upon the end of a shaft.

6. A pulley comprising two complementary flange sections, the first section having a long hollow hub on one side, the second section surrounding the inner end of the hub and having a sleeve fitting slidably over that part of the hub projecting beyond said second section, a post arranged axially of the hub and fixed at its inner end to the first flange section, the post having thereon an external shoulder at its outer end, the hub having longitudinal slots through the wall thereof, said sleeve having internal grooves registering with said slots, a loose spider surrounding said post and having arms projecting through said slots and into said grooves, and a compression spring that increases progressively in diameter from each end to the middle surrounding said post and engaged at its ends with said shoulder and said spider, respectively.

7. A pulley comprising two complementary flange sections, the first section having a long hollow hub on one side, the second section surrounding the inner end of the hub and having a sleeve fitting slidably over that part of the hub projecting beyond said second section, a post arranged axially of the hub and screwed at its inner end into the first flange section, the post having thereon an external shoulder at its inner end, the hub having longitudinal slots through the wall thereof, said sleeve having internal grooves registering with said slots, a loose spider surrounding the inner end of said post and having arms projecting through said slots and into said grooves, said spider containing a central opening large enough to permit the spider to be moved along the post past the said shoulder, a nut on the free end of the post, a washer on the post larger than the hole in and positioned outwardly from the spider, and a compression spring device surrounding said post and engaged at its ends with said shoulder and said washer, respectively.

PAUL F. KOCH.